US012792956B2

(12) United States Patent
Narayanan Thangaraj et al.

(10) Patent No.: US 12,792,956 B2
(45) Date of Patent: Nov. 10, 2026

(54) METHODS FOR TRAINING ARTIFICIAL INTELLIGENCE COMPONENTS IN WIRELESS SYSTEMS

(71) Applicant: InterDigital Patent Holdings, Inc., Wilmington, DE (US)

(72) Inventors: Yugeswar Deenoo Narayanan Thangaraj, Chalfont, PA (US); Swayambhoo Jain, Milpitas, CA (US); Sriram Ravula, Los Altos, CA (US); Ghyslain Pelletier, Montréal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 689 days.

(21) Appl. No.: 18/032,115

(22) PCT Filed: Oct. 19, 2021

(86) PCT No.: PCT/US2021/055594

§ 371 (c)(1),
(2) Date: Apr. 14, 2023

(87) PCT Pub. No.: WO2022/086949

PCT Pub. Date: Apr. 28, 2022

(65) Prior Publication Data

US 2023/0409963 A1 Dec. 21, 2023

Related U.S. Application Data

(60) Provisional application No. 63/135,836, filed on Jan. 11, 2021, provisional application No. 63/094,406, filed on Oct. 21, 2020.

(51) Int. Cl.

*G06N 20/00* (2019.01)
*G06N 3/045* (2023.01)

(Continued)

(52) U.S. Cl.

CPC ............. *G06N 20/00* (2019.01); *G06N 3/045* (2023.01); *G06N 3/0455* (2023.01); *G06N 3/084* (2013.01); *G06N 3/098* (2023.01)

(58) Field of Classification Search

CPC ...... G06N 20/00; G06N 3/045; G06N 3/0455; G06N 3/0495; G06N 3/084; G06N 3/088;

(Continued)

(56) References Cited

U.S. PATENT DOCUMENTS

2018/0076871 A1* 3/2018 Rahman ............... H04B 7/0634
2018/0322388 A1* 11/2018 O'Shea ................. H04L 1/0001

(Continued)

FOREIGN PATENT DOCUMENTS

EP 3576361 A1 * 12/2019 ......... H04L 25/0248
WO WO-2020192790 A1 * 10/2020 ........... H04B 7/0417

OTHER PUBLICATIONS

Wang, Tianqi, et al. "Deep learning for wireless physical layer: Opportunities and challenges." China Communications 14.11 (2017): 92-111. (Year: 2017).*

(Continued)

*Primary Examiner* — Andrew L Tank

(74) *Attorney, Agent, or Firm* — Flaster Greenberg P.C.

(57) ABSTRACT

A method is described for using artificial intelligence (AI) components in association with first a transceiver node in a wireless network, where the first node is configured to send data over a wireless channel and to initiate a training procedure for an artificial intelligent component in a second node. The first node, having an encoder, transmits, to a decoder in the second node, a plurality of ordered training pairs, the transmission in response to a detection of a trigger condition based on a reconstruction loss value determined by the first node. The first node receives, from the second node, partially processed training information correspond- (Continued)

Example of Joint WTRU and Network-Based Back Propagation ing to the transmitted training pairs. The first node updates learnable parameters of the encoder based on the received partially processed training information to reduce the reconstruction loss value.

20 Claims, 8 Drawing Sheets

(51) Int. Cl.
*G06N 3/0455* (2023.01)
*G06N 3/084* (2023.01)
*G06N 3/098* (2023.01)

(58) Field of Classification Search
CPC ........ G06N 3/0895; G06N 3/09; G06N 3/098; G06N 3/0985
See application file for complete search history.

(56) References Cited

U.S. PATENT DOCUMENTS

| | | | | |
|---|---|---|---|---|
| 2018/0367192 | A1* | 12/2018 | O'Shea | H04B 7/0452 |
| 2019/0123864 | A1* | 4/2019 | Zhang | H04L 5/005 |
| 2020/0007200 | A1* | 1/2020 | Schreck | H04B 7/0619 |
| 2020/0036995 | A1* | 1/2020 | Rippel | G06V 20/46 |
| 2020/0220593 | A1* | 7/2020 | Wen | G06N 3/0464 |
| 2020/0234725 | A1* | 7/2020 | Garbacea | G10L 25/30 |
| 2021/0110261 | A1* | 4/2021 | Lee | H04L 5/0055 |
| 2021/0264254 | A1* | 8/2021 | Yoo | G06N 3/0455 |
| 2021/0266763 | A1* | 8/2021 | Yoo | G06N 3/098 |
| 2021/0266787 | A1* | 8/2021 | Yoo | G06N 3/042 |
| 2021/0297178 | A1* | 9/2021 | Kim | G06N 3/045 |
| 2021/0319286 | A1* | 10/2021 | Gunduz | H04N 19/30 |
| 2022/0149904 | A1* | 5/2022 | Timo | H04L 1/0026 |
| 2023/0131694 | A1* | 4/2023 | Saber | G06N 3/0455<br>370/252 |

OTHER PUBLICATIONS

Wen, Chao-Kai, Wan-Ting Shih, and Shi Jin. "Deep learning for massive MIMO CSI feedback." IEEE Wireless Communications Letters 7.5 (2018): 748-751. (Year: 2018).*

Lin, Chuan, Qing Chang, and Xianxu Li. "A deep learning approach for MIMO-NOMA downlink signal detection." Sensors 19.11 (2019): 2526. (Year: 2019).*

Liao, Yong, et al. "CSI feedback based on deep learning for massive MIMO systems." IEEE Access 7 (2019): 86810-86820. (Year: 2019).*

Liu, Zhenyu, Mason del Rosario, and Zhi Ding. "A Markovian Model-Driven Deep Learning Framework for Massive MIMO CSI Feedback." arXiv preprint arXiv:2009.09468 (2020). (Year: 2020).*

Sangdeh, Pedram Kheirkhah, et al. "LB-SciFi: Online learning-based channel feedback for MU-MIMO in wireless LANs." 2020 IEEE 28th International Conference on Network Protocols (ICNP). IEEE, Oct. 16, 2020. (Year: 2020).*

Wu, Dehao, Maziar Nekovee, and Yue Wang. "Deep learning-based autoencoder for m-user wireless interference channel physical layer design." IEEE Access 8 (2020): 174679-174691. (Year: 2020).*

Ye, Hao, et al. "Deep learning-based end-to-end wireless communication systems with conditional GANs as unknown channels." IEEE Transactions on Wireless Communications 19.5 (2020): 3133-3143. (Year: 2020).*

3GPP TS 38.331 3rd Generation Partnership Project; Technical Specification Group Radio Access Network; NR; Radio Resource Control (RRC) protocol specification, Release 16, v.16.0.0 Mar. 2020.

Peihao Dong et al.; Framework on Deep Learning Based Joint Hybrid Processing for mmWave Massive MIMO Systems:, ARXIV. Org, Cornell University Library, 201 Olin Library Cornell University Ithaca, NY 14853, Jun. 5, 2020.

3GPP TS 38.321, Medium Access Control (MAC) protocol specification, Release 16; v16.0.0 dated Mar. 2020.

3GPP TS 38214 3rd Generation Partnership Project; Technical Specification Group Radio Access Network; NR; Physical layer procedures for data, v.16.0.0 dated Dec. 2019.

Gunduz Deniz et al.; "Machine Learning in the Air", IEEE Journal on Selected Areas in Communications, IEEE Service Center, Piscataway, US, vol. 37, No. 10, Oct. 1, 2019, pp. 2184-2199.

Zheng Cao et al.; "Lightweight Convolutional Neural Networks for CSI Feedback in Massive MIMI", ARXIV.Org, Cornell University Library, 201 Olin Library Cornell University Ithaca, NY 14853, May 1, 2020.

* cited by examiner

On-line Training Example

Example of Network-Based Back Propagation

Example of Joint WTRU and Network-Based Back Propagation

METHODS FOR TRAINING ARTIFICIAL INTELLIGENCE COMPONENTS IN WIRELESS SYSTEMS

CROSS REFERENCE TO RELATED APPLICATIONS

This application is a U.S. National Stage Application under 35 U.S.C. § 371 of International Patent Application No. PCT/US2021/055594, filed 19 Oct. 2021, which is incorporated herein by reference in its entirety.

This application claims the benefit of U.S. provisional patent application No. 63/135,836 filed 11 Jan. 2021, and U.S. provisional Application No. 63/094,406 filed on 21 Oct. 2020, which are incorporated by reference herein in their entirety.

FIELD

The present disclosure relates to a communication architecture, including, but not exclusively, to control of a 5G communications architecture.

BACKGROUND

Artificial intelligence may be broadly defined as the behavior exhibited by machines that mimics cognitive functions to sense, reason, adapt and act. Machine learning (ML) may refer to type of algorithms that solve a problem based on learning through experience ('data'), without explicitly being programmed ('configuring set of rules'). Different machine learning paradigms may be envisioned based in the nature of data or feedback available to the learning algorithm. For example, a supervised learning approach may involve learning a function that maps input to an output based on labeled training example, wherein each training example may be a pair consisting of input and the corresponding output.

For example, unsupervised learning approach may involve detecting patterns in the data with no pre-existing labels. For example, reinforcement learning approach may involve performing sequence of actions in an environment in order to maximize the cumulative reward. In some solutions, it is possible to apply machine learning algorithms using a combination or interpolation of the above-mentioned approaches. For example, semi-supervised learning approach may use a combination of a small amount of labeled data with a large amount of unlabeled data during training. In this regard semi-supervised learning falls between unsupervised learning (with no labeled training data) and supervised learning (with only labeled training data). An AI component may refer to realization of behaviors and/or conformance to requirements by learning based on data, without explicit configuration of sequence of steps of actions. Such AI component may enable learning complex behaviors which might be difficult to specify and/or implement when using legacy methods.

Deep Neural Networks (DNNs) are a special class of machine learning models inspired by the human brain wherein the input is linearly transformed and pass through non-linear activation function multiple times. DNNs typically consists of multiple layers where each layer consists of linear transformation and a given non-linear activation functions. The DNNs can be trained using the training data via a back-propagation algorithm. Recently, DNNs have shown state-of-the-art performance in variety of domains, e.g., speech, vision, natural language etc. and for various machine learning settings supervised, un-supervised, and semi-supervised.

Autoencoders are specific class of DNNs that arise in context of un-supervised machine learning setting wherein the high-dimensional data is non-linearly transformed to a lower dimensional latent vector using the DNN based encoder and the lower dimensional latent vector is then used to re-produce the high-dimensional data using a non-linear decoder. The encoder is function E (x; $W_e$) where x is the high-dimensional data and $W_e$ represents the parameters of the encoder. The decoder is a function D (z; $W_d$) where z is the low-dimensional latent input and $W_d$ represents the parameters of the encoder. Further, using training data $\{x_1, \ldots, x_N\}$ the autoencoder can be trained by solving the following optimization problem $$\{W_e^{tr}, W_d^{tr}\} = \arg\min_{W_e, W_d} \sum_{i=1}^{N} \|x_i - D(E(x_i; W_e); W_d)\|_2^2.$$

The above problem can be approximately solved using a backpropagation algorithm. Backpropagation is the process of calculating the gradient of a loss function with respect to learnable parameters of a neural network proceeding backwards through the neural network from the last layer through to the first. The trained encoder can be used to compress the high-dimensional data x to obtain low-dimensional latent representation $$z_x = E(x; W_e^{tr})$$

and trained decoder decompress the latent representation as $$\hat{x} = D(z_x; W_d^{tr}).$$

In $5^{th}$ generation new radio (5G NR) systems, configuration of multibeam antenna systems can consume significant resources in computation of control parameters. One such example is the configuration of multiple input multiple output (MIMO) antenna systems between transceivers. In a 5G NR system, channel state information reference signals (CSI-RS) may be used to measure the channel state between the transmitter and the receiver. The channel state may be used to determine modulation and coding order of the transmission, the precoding matrices to be used in multiple antenna transmission, etc.

In an example application of AI to aid in the configuration of multibeam antenna systems such as MIMO, CSI-RS in 5G NR may be used to measure the channel state as well as training of the transmit and receive beams in a directional transmission.

As an example, to illustrate the challenge where the application of AI could be useful, the CSI feedback problem can be considered. The CSI feedback, specifically in massive MIMO can consume significant resources as the channel assumes the form a large matrix. Autoencoders trained on channel matrices have been shown to be effective in the reducing the overhead by compressing the channel matrix. Additionally, autoencoders have been shown to achieve good accuracy even with reduced number of reference signals. In one approach, the autoencoders may be trained offline based on simulated channels and/or representative measurement samples from real world measurements. However, this approach is not effective as the distribution of channel matrices changes depending on the realistic channels, frequency band, WTRU capabilities, gNB capabilities, hardware imperfections, idealized/simplified models assumed during offline training does not hold true in realistic environments/implementations etc. Real time training of autoencoders over the realistic channel with interoperable standardized means is not addressed in the machine learning literature.

The disclosure herein addresses possible techniques for AI-related application of ML that can be applied to challenges in 5G NR such as MIMO configuration and control.

SUMMARY

In an example embodiment, a method is described for using artificial intelligence (AI) in association with a first transceiver node in a wireless network, where the first transceiver node is configured to send data over a wireless channel and to initiate a training procedure for an artificial intelligent component in a second node. The first node, having an encoder, transmits, to a decoder in the second node, a plurality of ordered training pairs, the transmission in response to a detection of a trigger condition based on a reconstruction loss value determined by the first node. The first node receives, from the second node, partially processed training information corresponding to the transmitted training pairs. The first node updates learnable parameters of the encoder based on the received partially processed training information to reduce the reconstruction loss value.

In another example embodiment, a method is described for use in a wireless network that includes a first transceiver node having a first artificial AI component and a second transceiver node having a second AI component. The method performing a training procedure over a wireless channel includes at least one of receiving over the wireless channel a plurality of ordered training pairs, updating learnable parameters of the second AI component, determining partially processed training information, and transmitting over the wireless channel the partially processed training information corresponding to the received training pairs.

Although various embodiments are described and/or claimed herein in which an apparatus, system, device, etc. and/or any element thereof carries out an operation, process, algorithm, function, etc. and/or any portion thereof, it is be understood that any embodiments described and/or claimed herein assume that any apparatus, system, device, etc. and/or any element thereof is configured to carry out any operation, process, algorithm, function, etc. and/or any portion thereof.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref") in the Figures indicate like elements, and wherein.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application. In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Figure 1A:
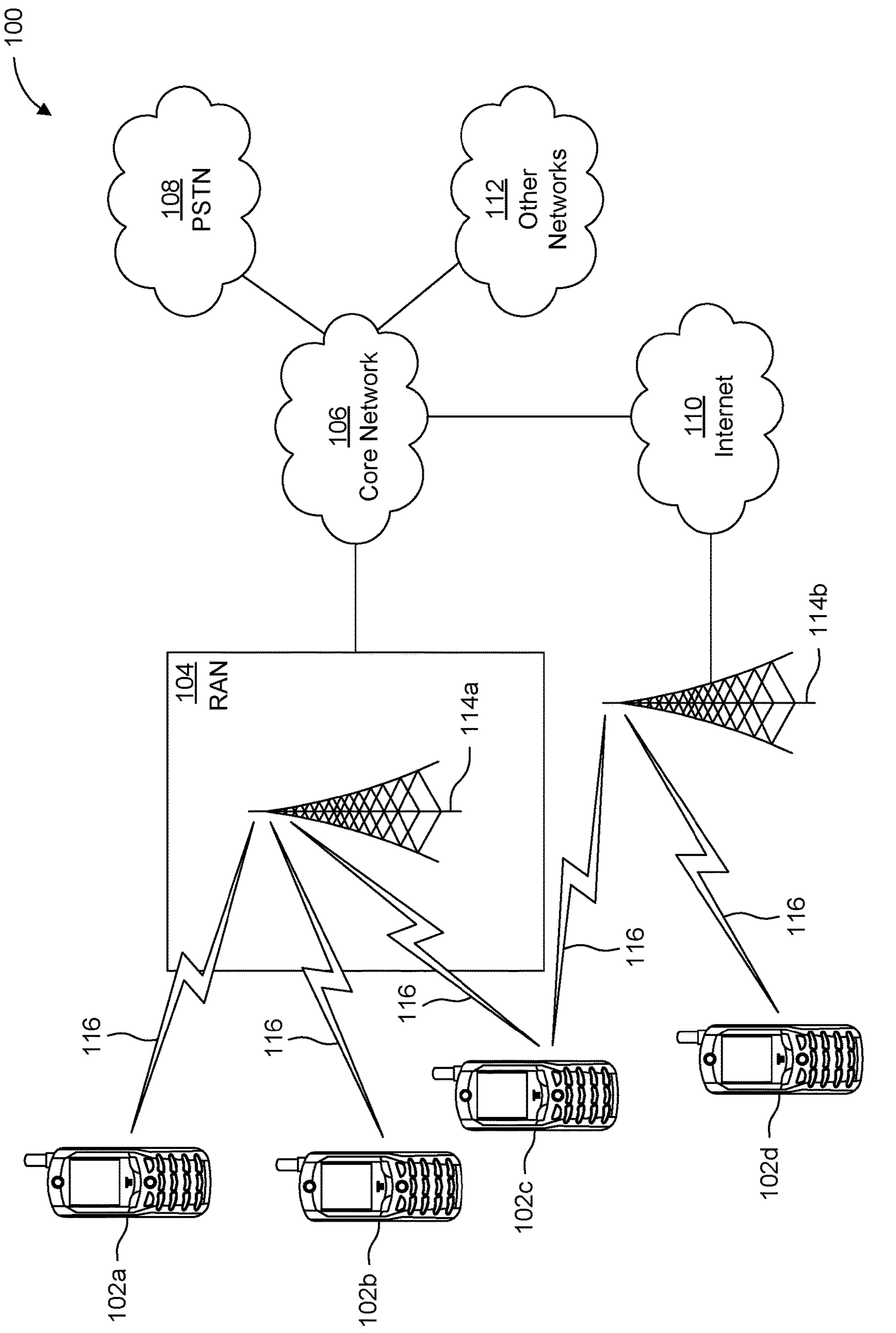
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs

102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 lx, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
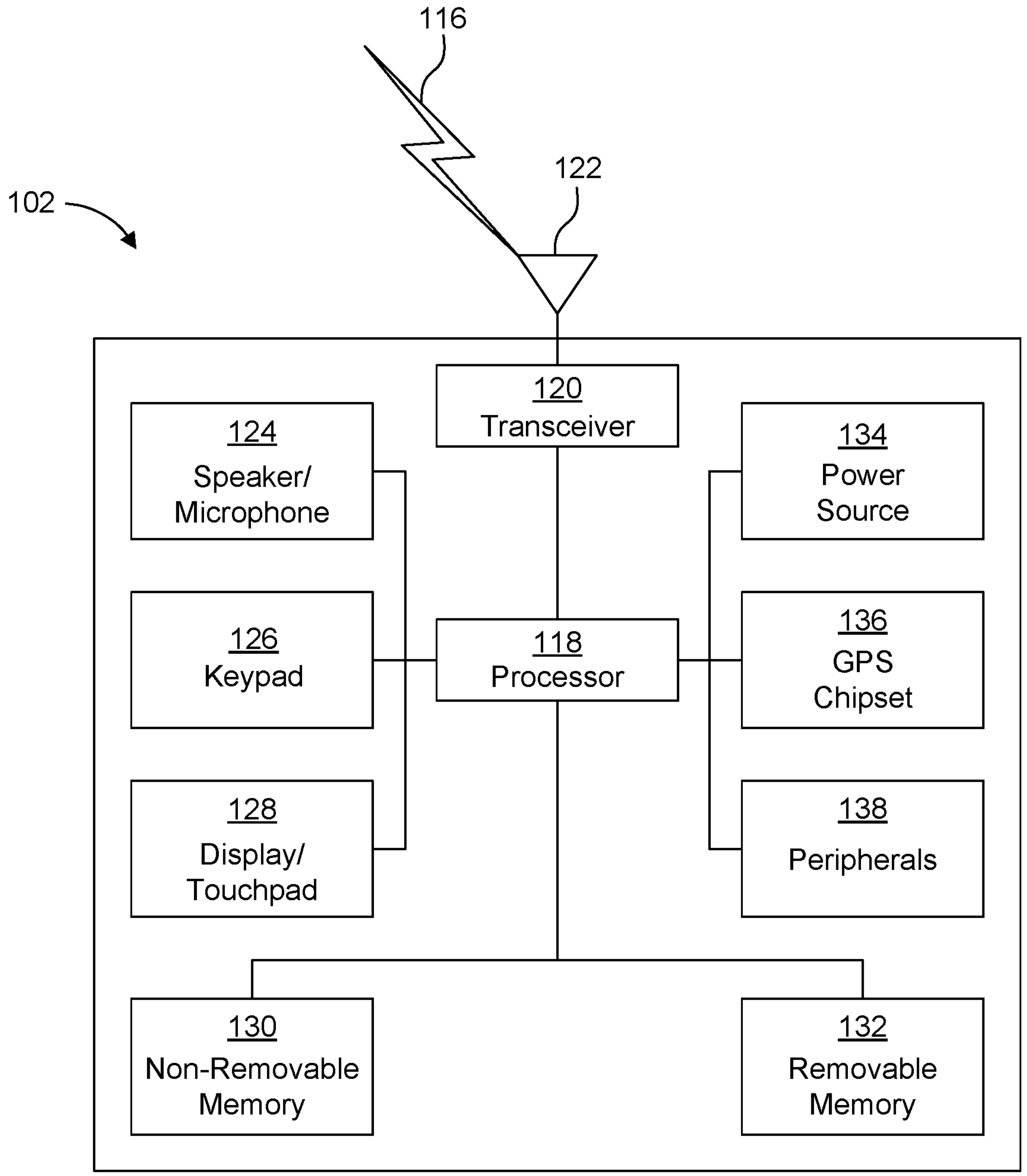
FIG. 1B is a system diagram illustrating an example WTRU that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
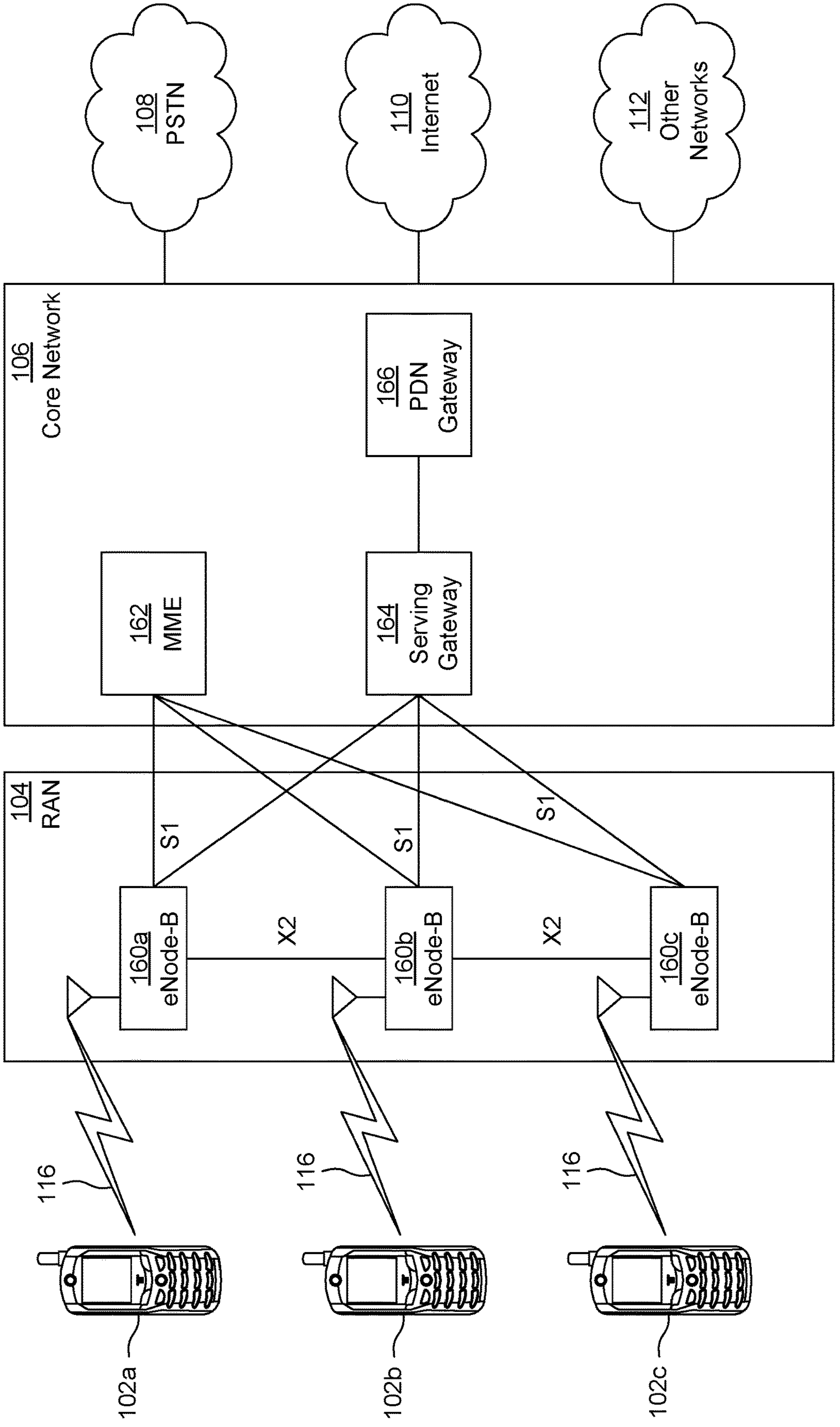
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an Si interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
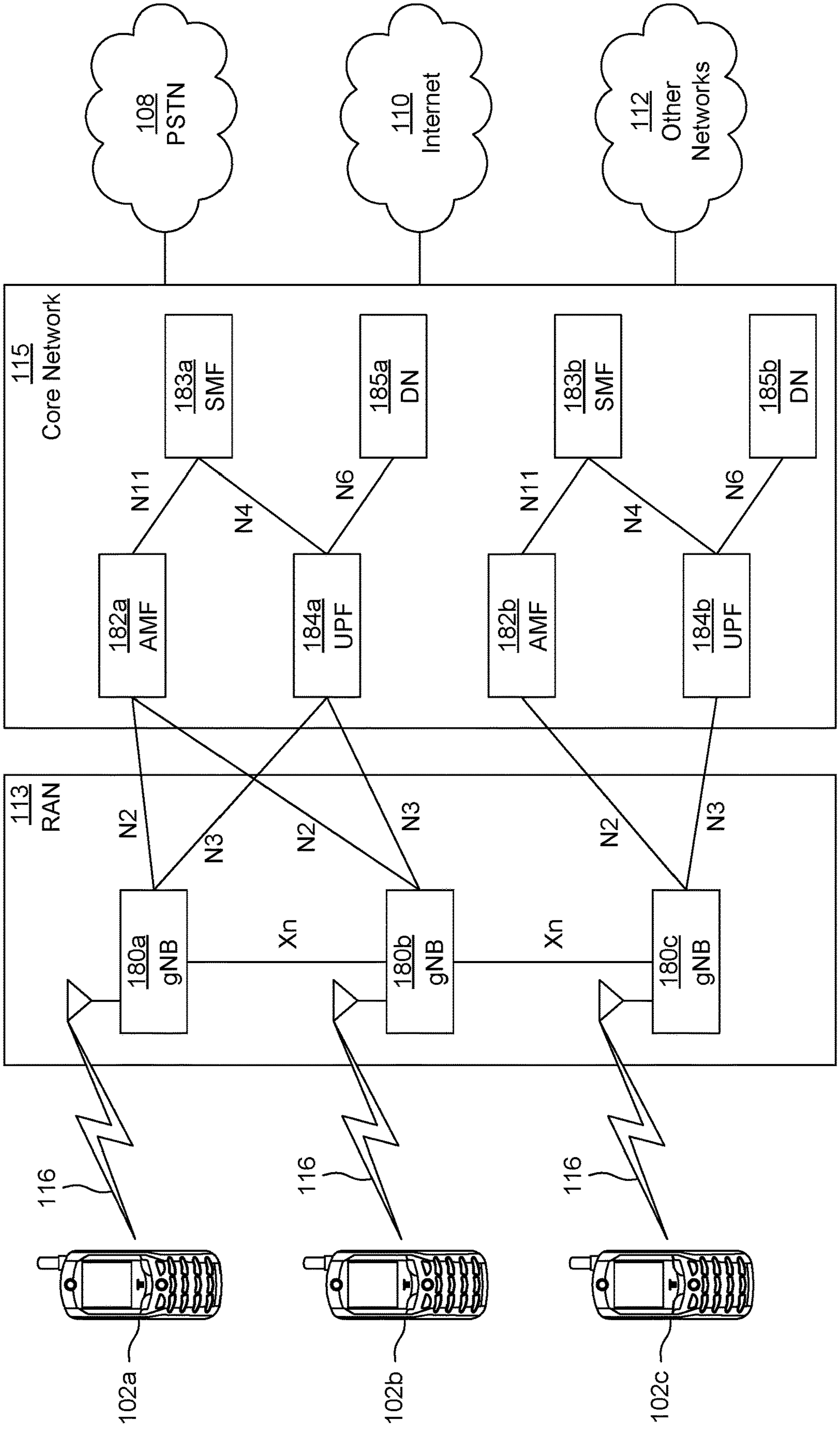
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of (non-access stratum) (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating WTRU/UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-ab*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Examples provided herein do not limit applicability of the subject matter to other wireless technologies, e.g., using the same or different principles as may be applicable.

As explained herein, a wireless transmit/receive unit (WTRU) may be an example of a user equipment (UE). Hence the terms UE and WTRU may be used in equal scope herein. The following description is for exemplary purposes and does not intent to limit in any way the applicability of the methods described herein to any wireless technology and/or to other technology, when applicable. The term network in this disclosure may refer to one or more gNBs which in turn may be associated with one or more Transmission/Reception Points (TRPs), or to any other node in the radio access network.

Artificial Intelligence (AI) and Machine Learning (ML) Use

As previously introduced, a possible application of AI technology is with regard to the challenge of CSI feedback in massive MIMO applications. Specifically, a large matrix may be needed for the configuration and control of massive MIMO systems. Real time training of autoencoders over the realistic channel with interoperable standardized means is achievable using the principles disclosed herein. Methods described herein are exemplified based on learning in wireless communication systems. The methods are not limited to such scenarios, systems, and services and may be applicable to any type of transmissions and/or services etc.

Methods for Training AI Components Online

A WTRU may be configured with an AI component communicatively linked to a remote AI component over a wireless channel. Herein, a component is an item performing a function and may include hardware, software, and/or firmware portions that may be used to implement the function. Thus, in one embodiment, an AI component may be a software module of a particular device that performs one or more functions within the device. In one solution, the AI component at the WTRU may correspond to an encoder function and the remote AI component may be a decoder function. In another example, the AI component at the WTRU may correspond to a decoder function and the remote AI component may be an encoder function. In one method, the AI component may be a ML model. Possibly the ML model may include at least in part a deep neural network. In one example realization, the encoder and decoder herein may be coupled to form an autoencoder architecture.

In one solution, the AI component may be located in the WTRU and the remote AI component may be located in the network. For example, the remote AI component may be collocated with the scheduling function in the network. For example, remote AI component may be collocated with one or more of the following: a base station, such as a gNB or other network controller, Distributed Unit (DU), Centralized Unit (CU), edge server, edge cloud or any other network node. To exemplify some of the solutions, CSI feedback is described as an example hereinbelow. It should be noted that the solutions described herein are applicable for any function/procedure. To exemplify some of the solutions, a WTRU and a network entity (such as a base station or gNB) and their interaction are described. It should be noted that the solutions described herein is also applicable for WTRU and other network entity (such as a remote WTRU) interaction. As referenced herein, the term WTRU may be interpreted as a local WTRU or first WTRU, and an example network entity may be a base station, such as a gNB, or a remote WTRU or second WTRU that is accessible via a network connection, such as a wireless connection. In one example description to follow, a WTRU (first or local WTRU) may contain a first AI component which may also be termed a local AI component. A network entity (a base station or a remote WTRU) may contain a second AI component which may also be termed a remote AI component. In one example instance, a first AI component (local AI component) can communicate with a second AI component (remote AI component) via the network entities of a local WTRU and a remote WTRU (or a base station) respectively.

Offline Learning

The term offline training or offline learning may refer to the action of determining and/or adjusting the learnable parameters of a AI component (e.g. weights and/or biases of a machine learning model) using the training data which may be synthetically created, possibly from a simulation of a channel model or a dataset created from a sampling of real world measurements. Such training is assumed to be done during the WTRU implementation.

Online Learning

The term online training or online learning may refer to the action of determining and/or adjusting the AI component (e.g. weights and/or biases of a machine learning model) using the training data which is created at least in part based on one or more of: channel measurements (reference signal received power (RSRP), reference signal received quality (RSRQ), signal-to-noise and interference ratio (SINR), block error ratio (BLER) or the like), interference measurement, received signals associated with data, control signaling from the network (NW), WTRU/NW feedback, protocol states, protocol status/variables, protocol data unit (PDU) headers/data, etc. Online learning may be performed in real time over the actual channel over which communication is carried out.

Given the training data of N channel realizations $\{H_1, \ldots, H_N\}$ where each channel realization is a complex tensor which can be converted to a real valued tensor by stacking real and imaginary parts to obtain $$\{[H_1^R; H_1^I], \ldots, [H_N^R; H_N^I]\} \text{ where } H_1^R, H_1^I$$

are real and imaginary part of the channel tensor $H_1$. The WTRU (such as a local WTRU or a first WTRU as described above) may be configured with the encoder component E associated with the autoencoder. The encoder E may be characterized by $$W_e^{tr};$$

corresponding to the learned parameters (e.g. weights and/or biases) of the AI component. The WTRU may be configured with the learned parameters using one or more of the following methods: unicast radio resource control (RRC) signaling, acquire from broadcast signaling, determine based on outcome of a training procedure etc. The WTRU may be configured to derive a compressed tensor $Z_H$ based on the latent representation of the channel tensor H, using the encoder component E of the autoencoder. For example, the latent compressed vector (an example latent representation) may be determined as follows:

$$Z_H = E([H^R; H^I]; W_e^{tr})$$

The WTRU may be configured to transmit CSI feedback based on the output of the encoder, corresponding to compressed channel tensor $Z_H$ or a processed version thereof. This compressed tensor is transmitted over the feedback channel to the gNB where the decoder part is used to obtain channel real and imaginary part as follows:

$$\left[\hat{H}^R; \hat{H}^I\right] = D(Z_H; W_d^{tr})$$

Wherein $$W_d^{tr}$$

may correspond to the learned parameters associated with the decoder component. In a solution, the learned parameters $$W_e^{tr} W_d^{tr},$$

may be calculated based on the following criteria $$\{W_e^{tr}, W_d^{tr}\} = \arg\min_{W_e, W_d} \sum_{i=1}^{N} \left\| [H_i^R; H_i^I] - D\left(E\left([H_i^R; H_i^I]; W_e\right); W_d\right) \right\|_2^2.$$

For a given tensor x the $l_2$ squared norm $$\|x\|_2^2$$

refers to the sum of squares of absolute values of the entries of the tensor x.

WTRU Triggers for Online Training

A WTRU Monitoring a Criterion Associated With AI Component, Initiates Online Training Based on Preconfigured Trigger Condition(s)

A WTRU may be configured to determine a performance metric associated with functioning of an AI component. The WTRU may be configured to monitor/evaluate the performance metric of the AI component relative to one or more preconfigured criteria. The WTRU may be configured to initiate an online training and/or fine-tuning procedure based on one or more trigger conditions. An example trigger condition could be that the performance metric of the AI component becomes worse than the preconfigured criteria. In some methods, the WTRU may be configured with different performance metric and/or trigger conditions based on one or more of the following: Placement of encoder/decoder component, WTRU capability, WTRU power saving state, criticality of the function/procedure, QoS etc.

Remote AI Component at the WTRU

A WTRU May be Configured With an AI Component and a Remote AI Component or Parts Thereof In one solution, a WTRU may be configured with an AI component and a remote AI component. In another solution, the WTRU may be configured with a portion of remote AI component. The WTRU may be configured to determine a performance metric associated with the AI component based on at least one aspect of remote AI component processing. The WTRU may be configured to determine a performance metric based on a combination of AI component and remote AI component processing.

A WTRU May be Configured to Initiate Online Training When the Reconstruction Loss is Above a Preconfigured Threshold In one example realization, a WTRU may be configured with an encoder component to compress channel state information. The WTRU may be further configured with a decoder component at the WTRU. The WTRU may be preconfigured with a reconstruction loss function, which may be a function of one or more of the following:

- A property associated with encoder component: In a solution, the reconstruction loss may be based on the learned parameters of the encoder component. For example, learned parameters may include the weights and/or biases of the encoder part of an autoencoder architecture.
- A property associated with decoder component: In a solution, the reconstruction loss may be based on the learned parameters of the decoder component. For example, learned parameters may include the weights and/or biases of the decoder part of an autoencoder architecture.
- A property associated with the latent space: In a solution, the loss function may be based on the latent representation of an autoencoder architecture.
- An aspect associated with a time window configuration: In a solution, the WTRU may be configured to monitor the output of the decoder component over a time window. The reconstruction loss may be a function of discrepancy between the encoder input and the decoder output. Possibly the reconstruction loss may be averaged over a time window. Possibly the time window may be a sliding window.

For example, the WTRU may be configured to monitor the average reconstruction loss at time t for past T channel realizations:

$$q(t) = \frac{1}{T} \sum_{i=t-T+1}^{t} \left\| [H_i^R; H_i^I] - D\left(E\left([H_i^R; H_i^I]; W_e\right); W_d\right) \right\|_2^2$$

The WTRU may be configured to trigger online training when the $q(t)>\epsilon$ where $\epsilon>0$. The WTRU may be preconfigured with the value of E in one or more of the following methods:

- Based on RRC configuration; for example, value of E may be included or linked to a CSI configuration
- Based on MAC CE configuration; for example, value of E may be included in activation/deactivation of CSI resource set
- Based on DCI indication; for example, DCI associated with an aperiodic request may also carry an indication of the value of E.

Classification/Prediction Model at the WTRU

A WTRU May be Configured With an AI Component to Monitor/Evaluate/Test the Functioning/Performance of Another AI Component In one solution, a WTRU may be configured with an AI component and an associated monitoring AI component.

The monitoring AI component may be configured to evaluate/determine the performance of the AI component. The WTRU may be configured to initiate an online training procedure based on the outcome of monitoring AI component. For example, the monitoring AI component may be a ML model that performs a classification task. Possibly the classification task may differentiate whether the output of an AI component may result in a performance above or below a threshold. Possibly the classification task may differentiate whether the output of a remote AI component may result in a performance above or below a threshold. In another example, the monitoring AI component may be a ML model that performs a prediction task. Possibly the prediction task may involve predicting the performance metric of AI component and/or remote AI component.

In a solution, the monitoring AI component may be desirably configured to be space efficient. For example, the monitoring AI component may require less memory/storage requirement than the decoder AI component. In a solution, the monitoring AI component may be desirably configured to be processing efficient. For example, the monitoring AI component may be of low complexity and require less operations than the decoder AI component. Additionally, the monitoring AI component may reduce the amount of overhead since there is no need to exchange the decoder weights between remote AI components.

WTRU May Initiate an Online Training Procedure Based on Outcome of a Monitoring AI Component A WTRU may be configured to initiate training for a first AI component based on outcome of a second AI component. For example, the first AI component may be the encoder component for the autoencoder architecture, and a related AI component may be a monitoring component associated with the encoder component. Possibly a linkage between AI components may be configured implicitly or explicitly. For example, the monitoring AI component may be configured with the output of an encoder component as the input. For example, the monitoring AI component may be configured with the input of the encoder component as additional or alternate input. For example, the monitoring component configuration may be a function of training data associated with the encoder component. For example, the output of the monitoring component may be used to determine whether a (re)training of the encoder component is required. For example, the monitoring AI component may output the probability that the encoder and/or decoder performance is below a threshold. The WTRU may initiate training if the probability is greater than a preconfigured threshold or value.

A low complexity ML model at the WTRU to determine if the channel matrix is significantly different from training data, or equivalently, a low complexity ML model to classify/predict is the channel matrix would lead to significant error in decompression at the NW. An example of the low-complexity ML model is shown below:

$$f(t)=\frac{1}{T}\sum_{i=t-T+1}^{i=t}\left(\hat{\mu}-E\left(\left[H_i^R;H_i^I\right];W_e\right)\right)^H\hat{\Sigma}\left(\hat{\mu}-E\left(\left[H_i^R;H_i^I\right];W_e\right)\right)$$

where $\hat{\mu}$ and $\hat{\Sigma}$ are the mean vector and covariance matrix respectively of latent representations of channel realization of the training data. The WTRU may be configured to initiate the online training if $f(t)>\tau$, where is r may be preconfigured for the WTRU. The WTRU may be configured to update the values of mean vector and covariance matrix $\hat{\mu}$ and $\hat{\Sigma}$ as a function of the learning outcome of the AI component.

Implicit/Explicit Triggers and Reporting

A WTRU May be Configured to Transmit an Indication Associated With Status of AI Component A WTRU may be configured to transmit an indication to the network when one or more trigger conditions are satisfied for online training. Possibly the indication may be configured as a scheduling request. Possibly the resources for scheduling request may be configured specifically for indication of online training. Possibly the priority of the scheduling request may be configured to be the highest. Possibly the priority of the scheduling request may be configured dynamically. For example, the status may include, but not limited to: the average construction loss, possibly expressed in terms of offset from the threshold, number of samples within the time window whose reconstruction loss is above the threshold, etc.

A WTRU May be Configured to Report the Reconstruction Loss to the NW Either Periodically, Semi-Persistently or a Periodically or Based on Preconfigured Triggers A WTRU may be configured to transmit the reconstruction loss to the network. In one solution, such reporting may be configured to occur periodically. The WTRU may be configured to report reconstruction loss on physical uplink control channel (PUCCH) resources. In one solution, the WTRU may be configured to transmit a scheduling request on preconfigured resources. In another solution, the reporting may be configured to occur semi-persistently. Possibly medium access control-control element (MAC CE) signaling may be used to activate/deactivate semi-persistent reporting. The WTRU may be configured to report reconstruction loss based on an aperiodic request from the NW. Possibly downlink control information (DCI) or a few bits therein may indicate that request for an aperiodic reporting of reconstruction loss. In another solution, the WTRU may be configured to report reconstruction loss based on preconfigured triggers. For example, a trigger condition may be based on a magnitude of reconstruction loss above a threshold.

In one or more of the solutions above, a quantized form of reconstruction loss may be reported. Possibly the reconstruction loss may be divided into different ranges and the WTRU may be configured to indicate a logical identity associated with different ranges.

One or more solutions above can also be applied for reporting an output from a monitoring AI component instead of reconstruction loss.

A WTRU May Adapt the Periodicity of Online Training as a Function of a Learned Parameter Update In a solution, a WTRU may be configured to perform online training based on expiry of a timer. Possibly such timer may enable periodic online training of an AI component. Possibly the value of the timer may be preconfigured. Possibly value of the timer may be adapted dynamically. For example, the WTRU may be configured to adapt the timer as a function of rate of change of channel conditions. In one solution, the WTRU may be configured to adapt the value of the timer as function of the statistics of the learned parameter update. For example, when the magnitude of weight updates and/or the number of weight updates are below a threshold, the WTRU may perform online training infrequently (i.e. increment the value of the timer). For example, when the magnitude of weight updates and/or the number of weight updates are above a threshold, the WTRU may perform online training frequently (i.e. decrement the value of the timer). Possibly the periodicity of the online training may be a function of magnitude of the reconstruction loss. Possibly the periodicity of online training may be a function of discontinuous reception (DRX) state and/or configuration of the WTRU. Possibly the periodicity of online training may be a function of WTRU mobility state and/or configuration of the WTRU.

A WTRU May be Configured With Prohibit Timer to Control the Frequency of Online Training In a solution, a WTRU may be configured to start a timer when online training is initiated. In another solution, a WTRU may be configured to start a timer when an online training is completed successfully. Possibly such timer may correspond to a prohibit timer. Possibly the WTRU may be configured not to initiate an online training procedure when the timer is running. Possibly the WTRU may be configured to evaluate the triggers for online training upon expiry of prohibit timer.

Procedure For Online Training

A WTRU may be configured to initiate an online training procedure, based on one or more trigger conditions described above in the section entitled WTRU Triggers for Online Training.

In a solution, the online training procedure may be a fine-tuning procedure. For example, fine tuning a preexisting model to achieve a better performance/accuracy. Possibly the preexisting model may be an offline trained model. Possibly the preexisting model may be a reference model. Possibly the preexisting model may be a previously online trained model.

In a solution, the online training procedure may be a (re)training procedure. For example, such (re)training procedure may be used to train a new and previously untrained model. Possibly the model may be initialized with weights and/or biases based on a heuristics/initialization function, wherein the initialization function may ensure a predefined distribution (e.g. uniform or normal distribution) of weights bounded by a preconfigured value.

WTRU Based Backpropagation

Backpropagation is the process of calculating the gradient of a loss function with respect to learnable parameters of a neural network proceeding backwards through the neural network from the last layer through to the first. In one method, the WTRU, such as a first or a local WTRU) may be configured with a local copy of remote AI component that is primarily resident in a network entity such as a base station (e.g. gNB or other controller in a network) or a remote WTRU. The WTRU may be configured to utilize at least one aspect of the remote AI component to perform online training. The WTRU may be configured to perform backpropagation over the AI component and remote AI components. The WTRU may be configured to update the learned parameters of the AI component. The WTRU may be configured to report the updated remote AI component to the network entity such as a base station or a remote WTRU.

WTRU Procedure to Determine and Process the Training Data

A WTRU may be configured to determine training data based on predefined criteria. For example, the WTRU may be configured to monitor a moving window of T channel measurements for a reconstruction loss criterion as defined above in the section entitled Remote AI component at the WTRU. The WTRU may consider the T samples which triggered the average reconstruction loss to exceed a threshold as the training data. The value of T may be predefined or preconfigured by the network. In another example, the WTRU may be configured to use the T latest samples as training data for aperiodic, periodic and/or semi-persistent training procedures. For example, the WTRU may receive an aperiodic request for training, wherein the aperiodic request may configure the value of T.

A WTRU Configured to Perform Training Over a Mixture of Training and Reference Data Samples In a solution, the WTRU may be preconfigured with a set of R reference channel realizations. Possibly such R reference channel realizations may be predefined and/or preconfigured for the WTRU. Possibly such R reference channel realizations are explicitly configured by the network e.g. via RRC signaling. Possibly a plurality of R reference channel sets may be preconfigured, and the WTRU may be configured to activate or deactivate a specific reference channel set by RRC, MAC CE or DCI signaling. Possibly the reference channel realizations are determined based on a predefined criteria. Possibly such criteria may include at least one aspect related to activations/gradients in different layers of the autoencoder. Possibly the criteria may include selecting samples that trigger activations/gradients above or below a threshold.

WTRU Configured to Acquire Decoder Weights

In one solution, the WTRU may be configured with the decoder weights. The WTRU may be configured to (re) acquire for the latest decoder weights. Possibly upon determination that the WTRU has an outdated version of the decoder weights. Possibly the WTRU may determine from implicit/explicit indication from the network if the decoder weights at the WTRU are outdated. Possibly such indication may be modeled like a toggling bit (e.g. new data indicator (NDI) bit or the like). The WTRU may be configured to utilize at least one aspect of the decoder weights to perform online training. The WTRU may be configured to perform backpropagation over the decoder and encoder components. The WTRU may be configured to update the learned parameters (e.g. encoder and decoder weights) based on online training. The WTRU may be configured to report the updated decoder weights to the network entity.

Configuration Aspects for Online Training

The WTRU may be configured with one or more hyperparameters associated with online training. For example, hyperparameters may be associated with training procedure and/or associated with the model architecture. For example, the WTRU may be configured with hyperparameters including but not limited to the following:

- learning rate; A scalar that may determine the size of gradient update. For example, during each iteration the learnable parameters may be affected by a product of learning rate and the gradient.
- minibatch size; A randomly selected subset of the entire batch of training data run in a single iteration of training
- epochs: An epoch is a full training pass over the entire training dataset such that each example has been seen once.
- optimization algorithm
- Number of hidden layers, hidden units, activation function etc.

In a solution, the WTRU may be configured adapt at least one parameter associated with online training as a function of one or more criteria. For example, the WTRU may be configured to adapt learning rate based the magnitude of the reconstruction loss.

A WTRU may be configured with the learning parameters associated with online training via RRC configuration. In a solution, the WTRU may be configured with plurality of configuration sets, each set containing the above-mentioned learning parameters. and MAC CE/DCI signaling may be used to activate and/or deactivate a specific configuration. Possibly the MAC CE/DCI to activate/deactivate a configuration may be in response to WTRU indication of reconstruction loss or an indication of the status associated with AI component. Possibly the MAC CE/DCI to activate a configuration may trigger the WTRU to perform online training.

Figure 2:
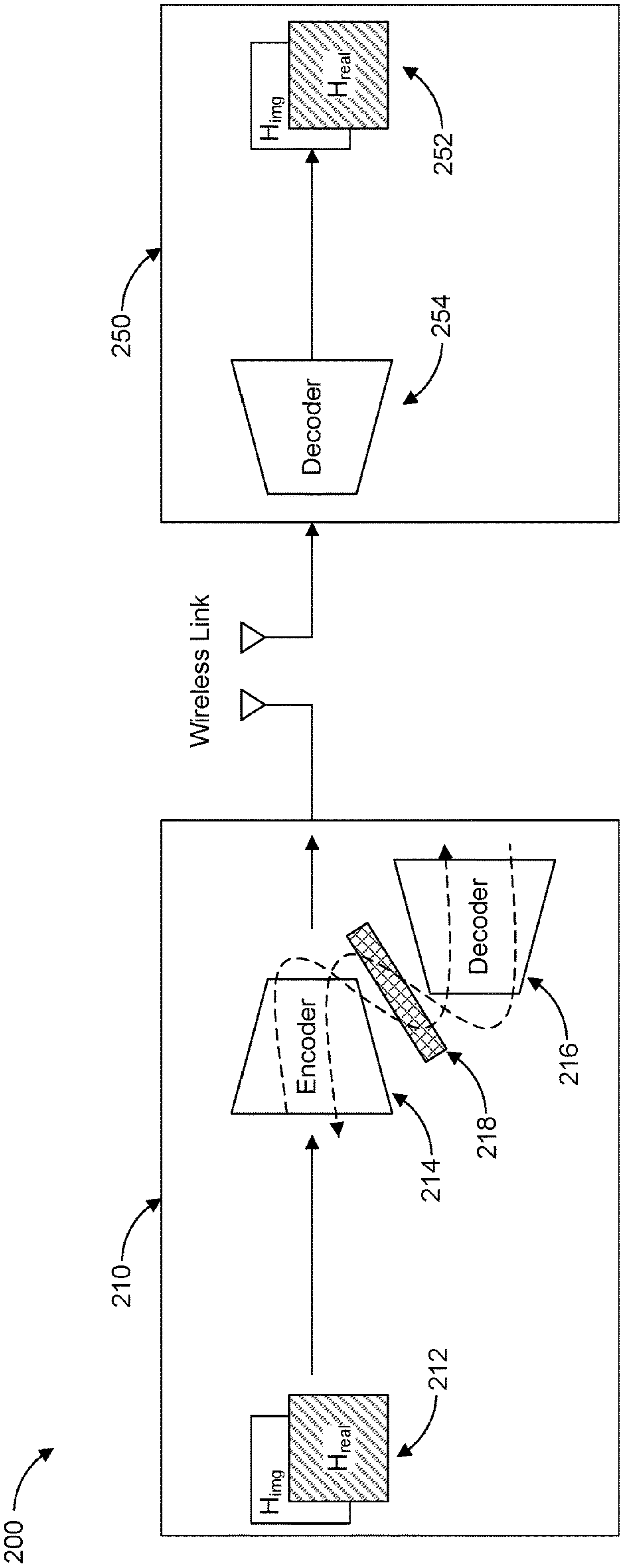
FIG. 2 depicts an on-line AI training example.

FIG. 2 is a depiction 200 of a WTRU 210 to network device (network entity) 250 configuration that includes aspects of on-line training. In FIG. 2, a WTRU, (local WTRU) 210 includes an encoder 214 as a first AI component 214 and a copy 216 of a decoder (copy of network entity decoder 254) along with a monitoring function 218 (monitor component). The WTRU 210 has access to channel realization $H_{real}$, $H_{img}$ 212 as a complex tensor having real and imaginary parts. The WTRU 210 communicates via the wireless link to a network device 250 which includes an instance of a decoder 254. In one method, using the configuration of FIG. 2, (1) a first WTRU 210 accesses the real and imaginary parts of a channel tensor 212, (2) the WTRU 210 performs a forward pass and a backpropagation pass through the encoder 214 and decoder 216 respectively, (3) the WTRU updates the weights via monitor function 218 (monitor component), and (4) the WTRU 210 transmits the updated decoder weights to the network device 250 (network entity or network element) which has a decoder 254 to recover or reconstruct the real and imaginary parts 252 of the transmitted channel tensor. In the example 200, the network entity 250, such as a base station or remote WTRU, receives from the first WTRU 210 an update for the second AI component 254. The update of decoder 254 weights results from the forward and backpropagation passes of the first AI component 214 and copy 216 of the decoder respectively in the WTRU 210.

How Does the WTRU Determine That the Training is Complete

In a solution, the WTRU may determine that the training is complete based on a condition associated with the loss function when calculated based on a set of training data. For example, the WTRU may determine that the training is complete based on the following condition, $$l(W_e, W_d; t) = \frac{1}{T}\sum_{i=t-T+1}^{t} \left\|\left[H_i^R; H_i^I\right] - D\left(E\left(\left[H_i^R; H_i^I\right]; W_e\right); W_d\right)\right\|_2^2$$

In one solution, the WTRU may be configured to adjust the $W_e$ and $W_d$ such that the above function l( ) is minimized. In another solution, the WTRU may be configured to perform training until the value of $l(W_e, W_d; t) < \mu$ where $\mu < \epsilon$. The value of $\mu$ may be preconfigured. In a solution, the value of $\mu$ may be an offset to $\epsilon$.

Means to Avoid Overfitting or Forgetting the Previous Learning

In a solution, the WTRU may be configured to with a loss function, which includes a criterion that implicitly ensures means to avoid forgetting the learning from previous training. For example, $$l(W_e, W_d; t) = \frac{1}{T}\sum_{i=t-T+1}^{t} \left\|\left[H_i^R; H_i^I\right] - D\left(E\left(\left[H_i^R; H_i^I\right]; W_e\right); W_d\right)\right\|_2^2 + \gamma_1\left\|W_e^{old} - W_e\right\|_2^2 + \gamma_2\left\|W_a^{old} - W_d\right\|_2^2$$

Where $$W_e^{old}, W_d^{old}$$

are the parameters of encoder and decoder when the training was triggered by one of mechanism in the above section entitled WTRU triggers for online training, $\gamma_1, \gamma_2 \geq 0$ are the regularization parameters that control distance from $$W_e^{old}, W_d^{old}$$

to ensure the performance on the training set is preserved.

In another approach, WTRU may be configured in addition or alternative to above approaches, a dropout regularization, wherein the WTRU may remove a random selection of a fixed number of the units in a network layer for a single gradient step.

A WTRU Configured to Determine the Successful Training Based on a Criterion

In another solution, the WTRU may determine that the training is complete based on a condition associated with the loss function when calculated based on set of data samples. Possibly the set of data samples may include one or more of the following: training data, test data, training and test data, test data and reference data, training and reference data, training, test, and reference data.

In yet another solution, the WTRU may determine that the training is complete when both the following are true:

- A condition associated with the loss function when calculated based on set of training data is below a first threshold and
- A condition associated with the loss function when calculated based on set of test data is below a second threshold.

In another solution, the WTRU may determine that the training is complete based on number of epochs, wherein the number of epochs are preconfigured by the network. The WTRU may be configured to pick the best decoder weights which leads to lowest loss on training and/or test data within the configured number of epochs.

In another solution, the WTRU may determine that the training is complete based on expiry of timer, wherein the value of the timer is preconfigured by the network. The WTRU may be configured to pick the best decoder weights which leads to lowest loss on training and/or test data within the configured training time.

In another solution, the WTRU may determine that the training is complete based on earliest of the following conditions: the loss function is below a threshold, timer expiry or completion of a preconfigured number of epochs.

A WTRU Configured to Indicate the Completion of Online Training

A WTRU may be configured to indicate the completion of online training to the NW. The WTRU may be configured to indicate the completion of online training via a scheduling request. Possibly the resources for scheduling request may be configured specifically for this purpose. Possibly the priority of the scheduling request associated with completion of online training may be configured to be the highest. Possibly the priority of the scheduling request associated with completion of online training may be configured dynamically. Possibly the WTRU may be configured to transmit the trained decoder weights to the network. The WTRU may be configured with a configured grant resource for the transmission of decoder weights to the network.

A WTRU Configured to Update the AI Component With Local Online Training Results Based on Trigger From the Network The local WTRU may be configured to use its local AI component with previously learned parameters while the online training is ongoing. Possibly also during a short time period after completion of the online training. The WTRU may be configured to monitor/test for an explicit or implicit trigger from the network to use the AI component with updated learned parameters from online training. Possibly the trigger may be based on explicit indication carried in a RRC signaling, MAC CE or a DCI. Possibly the trigger may be based on implicit trigger, for e.g. based on indication associated with the identity and/or version of the remote AI component. Possibly such identity may indicate that the network has updated the decoder weights and the WTRU may apply the new encoder weights.

NW Based Backpropagation

A WTRU May be Configured to Transmit the Training Data to the Remote AI Component at the NW Based on One or More Triggers A WTRU may be configured to an indication to the network based on one or more trigger conditions described above in the section entitled WTRU Triggers for Online Training. The WTRU may initiate transmission of the training data to the remote AI component based on one or more trigger conditions described above in the section entitled WTRU Triggers for Online Training.

Figure 3:
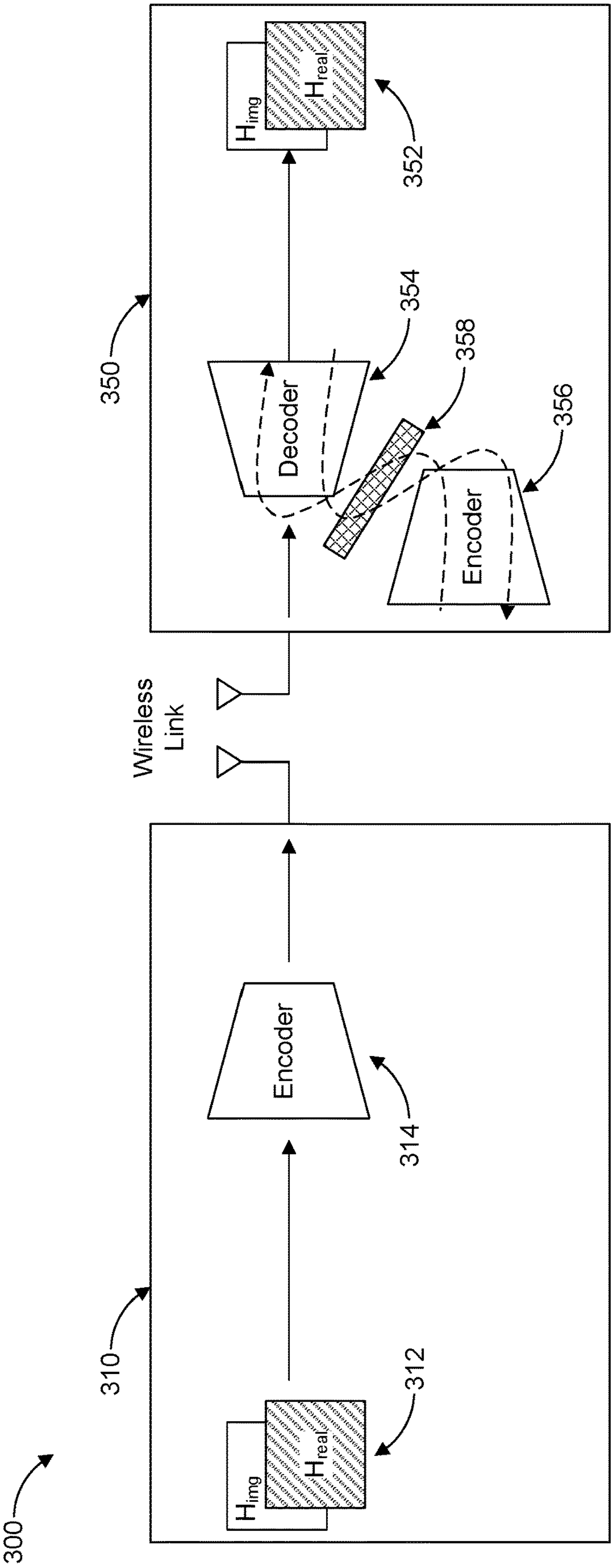
FIG. 3 depicts an on-line network-based backpropagation example.

FIG. 3 is a depiction of a network to WTRU configuration that includes aspects of on-line training using network-based backpropagation. In FIG. 3, a WTRU, (local WTRU) 310 includes an encoder 314 as a first AI component 314. The WTRU 310 has access to channel realization $H_{real}$, $H_{img}$ 312 as a complex tensor having real and imaginary parts. The WTRU 310 communicates via the wireless link to a network device 350 which includes an instance of a decoder 354 and a copy 356 of encoder 314 along with a monitoring function 358 and the real and imaginary parts 352 of the channel tensor transmitted by the WTRU 310. In one method, using the configuration of FIG. 3, (1) a network device 350 receives the encoder weights and estimated channel model parameters of real and imaginary parts of a channel tensor 312, (2) the network device 350 performs a forward pass and a backpropagation pass through the decoder 354 and encoder 356 respectively, and uses the monitoring/testing function 358 to assisting in an update of the desired encoder weights that encoder 314 should have, (3) the network device 350 updates the encoder 356 weights, and (4) the network device 350 transmits the encoder weights to a the WTRU 310 which has an encoder 314 for the real and imaginary parts 312 of the transmitted channel tensor. In the example 300, the first or local WTRU 310 can receive an update of encoder weights due to the forward pass and backpropagation pass occurring in the network device 350. As such, the second AI component 354 in the network entity performs a forward pass and backpropagation with encoder copy 356. The monitoring function 358 may be used to assist in the update of weights for encoder 314. Thus, the second AI component 354 assists in updating the first AI component 314. Note that monitor function 358 and encoder copy 356 may also be considered AI components.

A WTRU may be configured with a set of resources for transmission of training data. Possibly the resources may be configured by means of configured grants. Possibly the WTRU may receive a MAC CE activating the configured grants associated with training data transmission. Possibly in response to the indication of trigger condition for training. In a solution, the WTRU may be configured with a specific radio bearer for transmission of training data. Possibly the radio bearer may be configured as a signaling radio bearer. Possibly the priority of such radio bearer may be preconfigured.

In a solution, the WTRU may be configured to perform one or more actions associated with the AI component that triggered conditions as described above in the section entitled WTRU Triggers for Online Training. For example, the WTRU may be configured to suspend the usage of a local AI component, until an activation command is received from the network. For example, the WTRU may be configured to suspend the usage of a local AI component, until updated weights are received from the network.

A WTRU Configured to Update the AI Component With Remote Online Training Results Based on Trigger From the Network The WTRU may be configured to receive updated learned parameters associated with an AI component. Possibly the WTRU may be configured with a configured grant for the purpose of downloading the updated parameters of the AI component (e.g. decoder weights/biases). In a solution, the WTRU may be configured with a specific radio bearer for the download. Possibly the radio bearer may be configured as a signaling radio bearer. Possibly the priority of such radio bearer may be preconfigured.

The WTRU may be configured to use the old learned parameters until explicitly configured to update the local AI component. The WTRU may be configured to monitor for an explicit or implicit trigger from the network to use the AI component with updated learned parameters from online training. Possibly the trigger may be based on explicit indication carried in a RRC signaling, MAC CE or a DCI. Possibly the trigger may be based on implicit trigger, for e.g. based on indication associated with the identity and/or version of the remote AI component. Possibly such identity may indicate that the network has updated the decoder weights and the WTRU may apply the new encoder weights.

Joint WTRU and NW Backpropagation

Figure 4:
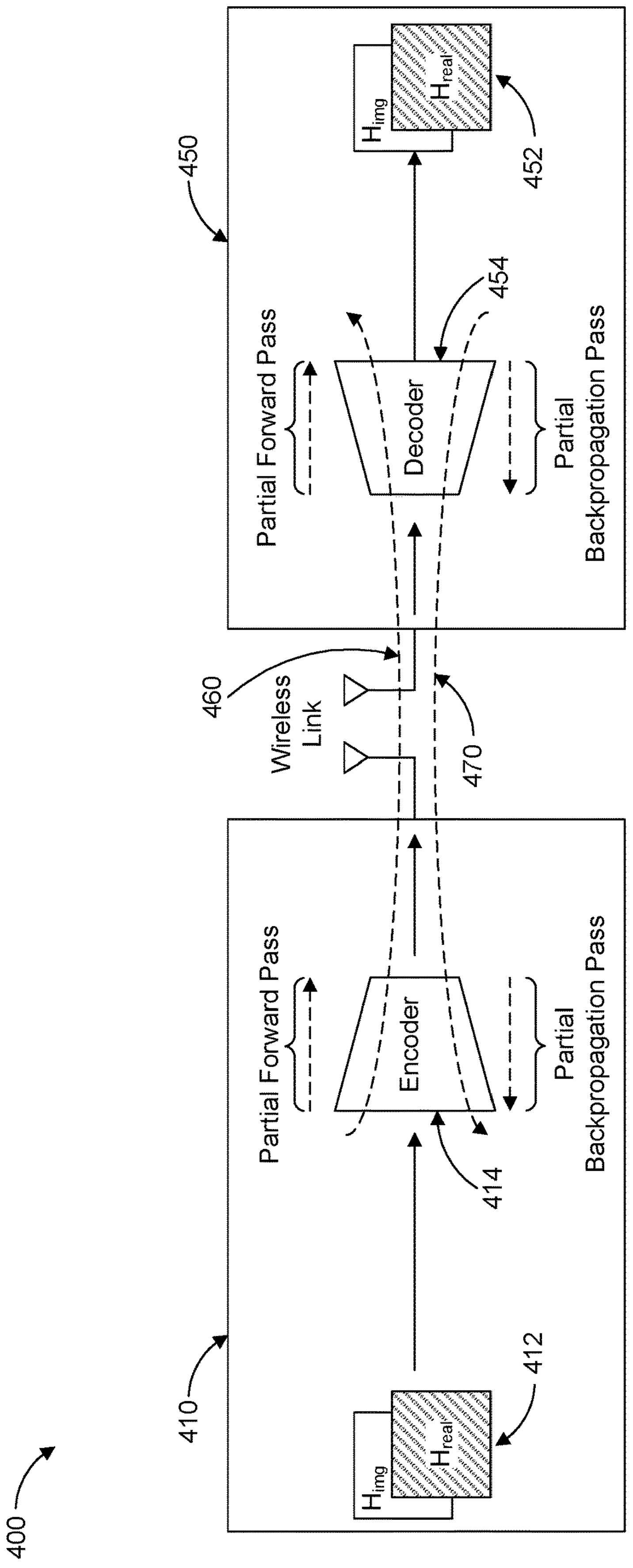
FIG. 4 depicts an on-line joint WTRU and network-based backpropagation example.

FIG. 4 is a depiction 400 of a device to device configuration that includes aspects of on-line training using joint WTRU and network backpropagation. In FIG. 4, A WTRU 410 (first or local WTRU) includes a first AI component encoder 414 having access to real and imaginary parts $H_{real}$, $H_{img}$, 412 of a channel tensor describing parameters of the wireless link. The encoder 414 is capable of performing a partial forward pass as well as a partial backpropagation pass. An AI encoder monitoring function/module/component, similar to that of 218 in FIG. 2 is also assumed as part of the overall encoder 410 architecture.

A network entity 450 (gNB or remote WTRU) includes a second AI component decoder 454 to determine real and imaginary parts $H_{real}$, $H_{img}$, 452 of a received channel tensor describing parameters of the wireless link. The decoder 454 is also capable of performing a partial forward pass as well as a partial backpropagation pass. An AI decoder monitoring function/module/component, similar to that of 358 in FIG. 3 is also assumed as part of the overall decoder 450 architecture.

Also shown in FIG. 4 are a forward pass path 460 and a backpropagation pass path 470. The forward pass path 460 may include messages that indicate a training pair (e.g. input to encoder, output of encoder) and an address of the specific decoder component 454. The backpropagation pass path 470 may include messages that indicate a tensor state and an address of the encoder component 414.

In one example method, using the configuration of FIG. 4, (1) a WTRU 410 transmits a set of encoded CSI code points along forward pass path 460 which are indicated as training samples and associated reference CSI as a target, (2) the network entity/device 450 decodes the received CSI code points using decoder 454 and determines the loss with respect to the reference CSI, (3) the network device 450 performs a partial backpropagation through the corresponding the decoder 454, (4) the network device 454 transmits gradients to the WTRU 410 along the backpropagation path 470 corresponding to a back propagation through the decoder 454, (5) the WTRU 410 performs the remaining backpropagation through the encoder 414, and (6) the network device 450 and WTRU 410 update their respective weights at a synchronized time.

A WTRU, such as 410, may be configured to perform one or more actions below when one or more trigger conditions described above in the section entitled WTRU Triggers for Online Training are satisfied. In a solution, one WTRU action could be to perform joint AI component and peer AI component training. For example, the WTRU may be configured to perform joint training for local encoder 414 and remote decoder 454 together making up an autoencoder architecture. Possibly such training may be performed online over a real wireless channel. The joint training procedure may avoid transmission of decoder and/or encoder weights over the air, providing benefits like reduced overhead and power consumption.

A WTRU, such as 410, may be configured to transmit one or more of a pair of encoder input and encoder output to the peer AI component 454. Possibly the encoder input and output pairs may be determined using a first set of encoder weights. The WTRU may be configured to transmit encoded CSI and associated reference CSI, wherein the reference CSI may be an uncompressed CSI. Possibly the encoded CSI may be transmitted with UL control channel resources. Possibly the WTRU may be configured with PUCCH resources specifically for encoded CSI transmission. Possibly the WTRU may be configured to append UCI associated with training data multiplexed with a physical uplink shared control channel (PUSCH). Possibly the PUCCH resources for sending encoded CSI during joint training may be different from PUCCH resources for sending encoded CSI during other times. Possibly the WTRU may be configured with physical channels specifically for training. Possibly the WTRU may be configured to transmit uncompressed CSI with PUSCH resources. Possibly configured grant may be allocated for the WTRU to transmit uncompressed CSI. The WTRU may be configured to indicate the correspondence between encoded CSI transmission and uncompressed CSI transmission. Possibly such indication based on relation between PUCCH resource and configured grant resource, in time and/or frequency.

The network may apply the encoded CSI as input to the remote AI component (e.g. decoder) and perform forward pass to obtain the output. The network may compute the loss based on the difference between the output of the decoder and the associated reference CSI. The network may perform partial backpropagation over the decoder component. At the end of partial backpropagation, the tensor state is calculated at the input of the decoder. Different realizations of tensor states are possible. For example, tensor states may be configured to provide sufficient information to enable backpropagation of the AI component associated with the WTRU. For example, the tensor state may correspond to the gradients of the first layer of the remote AI component (e.g. decoder). For example, the tensor state may include information regarding the parameters related to regularization. For example, the tensor state may include the information regarding the parameters related to dropouts. For example, the tensor state may include information regarding a configuration aspect related to learning including but not limited to learning rate, decay etc.

The WTRU may be configured to receive tensor state information from the remote AI component. In a solution, the WTRU may be configured to receive tensor state information via PDSCH resources, possibly via dynamic grants. Possibly the WTRU may be configured with configured grant resources to receive tensor state information. The WTRU may be configured to perform partial backpropagation on the AI component using the received tensor state. The WTRU may be configured to update the learnable parameters (e.g. weights and/or biases) as a result of partial backpropagation. In a solution, the WTRU may be configured to determine the changes to the learnable parameters and apply/update learned parameters based on a condition. For example, the condition may be a function of a number of training samples. For example, the condition may be based on explicit command from the network. For example, the condition may be a function of a preconfigured timer. In addition, the WTRU may be configured with a number of hyperparameters as outlined in the above section entitled WTRU based backpropagation. Possibly the WTRU may be configured with optimization algorithm to use for gradient descent including, not limited to adaptive gradient methods, adaptive moment estimation methods, etc. The joint training procedure described above may be repeated for T training data samples. In one method, the WTRU may be configured for a batch gradient descent, wherein the WTRU is configured to perform joint training procedure using all the T samples. In another method, the WTRU may be configured for a mini-batch gradient descent, wherein the WTRU may perform joint training procedure is done on randomly chosen B samples from T samples (B<T). The WTRU may be configured with the pseudo-random order to shuffle the training samples.

In a method, a WTRU may be configured with low latency joint training procedure. For example, the UL resources for WTRU transmission of encoded CSI and uncompressed CSI transmission and the DL resources for tensor states may be configured according to WTRU capability and processing time required for forward pass and partial backpropagation. An example realization of joint backpropagation algorithm is shown below.

This algorithm may be uses for fine-tuning via joint WTRU and NW backpropagation. Repeat until convergence for k=1, 2, . . . :

Step 1: The WTRU calculates the forward pass on the local encoder on T Samples to obtain their encoded representations $$z_i^{(k)} = E([H_i^R; H_i^I]; W_e^{(k)}),\ i = t - T + 1, \dots, t$$

and transmits them to the NW device.

Step 2: The NW device completes the forward pass by passing $$\{z_{t-T+1}^{(k)}, \dots, z_t^{(k)}\}$$

through the remote decoder and calculates the loss as follows:

$$\frac{1}{T}\sum_{i=t-T+1}^{t} \|[H_i^R; H_i^I] - D(z_i^{(i)}; W_d^{(k)})\|_2^2 + \gamma_1\|W_e^{old} - W_e^{(k)}\|_2^2 + \gamma_2\|W_d^{old} - W_d^{(k)}\|_2^2$$

Step 3: Using the loss function calculated in the above Step 2 the NW device completes the back-propagation algorithm of the remote decoder part to calculate the gradients $$G_d^{(k)}$$

with respect to the remote decoder parameters and updates the remote decoder parameters as follows:

$$W_d^{(k+1)} = W_d^{(k)} - \eta_k^d G_d^{(k)}$$

Step 4: The NW device computes the necessary tensor states $$\{s_{t-T+1}^{(k)}, \dots, s_t^{(k)}\}$$

and transmits them to WTRU for completing the backward (backpropagation) pass on the local encoder part. For example, the tensor states may include information sufficient enough for the gradient computation associated with layers in the local encoder model.

Step 5: Using the states $$\{s_{t-T+1}^{(k)}, \dots, s_t^{(k)}\}$$

the WTRU completes the backpropagation on the encoder weights to compute the gradients $$G_e^{(k)}$$

and updates the encoder weights as follows:

$$W_e^{(k+1)} = W_e^{(k)} - \eta_k^e G_e^{(k)}$$

Autoencoder Training With Quantized Latent Vector

In practice, some form of quantization is applied to transmit the encoder output so that the latent vector can be transmitted as vectors of discrete values. In legacy approaches it may be useful to apply quantization to fit latent vectors within a preconfigured bit-width, e.g. 8-bit quantization. But the problem with this approach is that it leads to loss of information and the decoder cannot recover the channel exactly. The issue can be attributed to the fact that the autoencoder training may not take into account quantization effects. It should be noted that quantization is not a differentiable function. Hence it may not be straightforward to train the autoencoder using backpropagation.

In one solution, the WTRU may be configured to train an autoencoder with quantized latent vector. The proposed solutions herein may enable enhanced compression of latent vector. Possibly using lossless entropy coding. The proposed solutions herein may enable flexible and/or configurable tradeoff between compression level and reconstruction quality.

In another solution, the WTRU may be configured to apply a quantizer layer at the output of the encoder during inference. For example, the latent representation obtained by encoder may be quantized for achieving further compression $$Z_H^q = Q(E([H^R; H^I]; W_e))$$

where the quantizer Q may apply rounding each entry of the encoded vector $E([H^R; H^I]; W_e)$ to the nearest integer. In some solutions, the WTRU may be configured to apply compression on the quantized vector. For example, the quantized vector $Z^q$ can then be further compressed using lossless entropy coding methods.

The decoder may apply decompression operation to invert lossless entropy coding followed by de-quantization. For example, the decoder may apply a de-quantizer $Q^{-1}$ and decode the latent vector as follows:

$$[\hat{H}^R; \hat{H}^I] = D(Q^{-1}(Z_H^q; W_d))$$

WTRU May be Configured to Apply a Noise Layer With Preconfigured Statistics to the Output of Autoencoder During Training Procedure The WTRU may be configured to apply a noise layer with preconfigured statistics to the output of autoencoder during the training procedure. The WTRU may be configured to selectively apply the noise layer during training and skip/remove the noise layer during inference. For example, the noise layer may be configured to add noise uniformly distributed within a range e.g. [−0.5, 0.5]. For example, such solution may overcome the issue of non-differentiable quantization. In one example, during the forward step of training, the WTRU may add noise uniformly distributed in [−0.5, 0.5] to each component of the output of the encoder as follows:

$$\hat{Z}_H = E([H^R; H^I]; W_e) + N$$

where N is the noise tensor with same dimensions as $\hat{Z}_H$.

The WTRU may be configured to transmit the $\hat{Z}_H$ to the network. The decoder may then use the $\hat{Z}_H$ as input for decoding as follows:

$$\left[\hat{H}^R; \hat{H}^I\right] = D(Z_{\hat{H}}; W_d)$$

The backpropagation can then be performed using methods described herein, such as in the section entitled WTRU Based Backpropagation, Network Based Backpropagation, and Joint WTRU and NW Backpropagation.

WTRU May Train an Autoencoder so That a Configured Criteria Based on Tradeoff Between Compression and Reconstruction Loss is Satisfied In some solutions, the WTRU may be configured to perform backpropagation with the means to control the tradeoff between compression and reconstruction loss. For example, the vector $\hat{Z}_H$ may be input to entropy estimator network $\Phi(\hat{Z}_H; W_\Phi)$, wherein the entropy estimator network may be configured to estimate entropy of $\hat{Z}_H$, using a neural network characterized by weights $W_\Phi$. The WTRU may be configured to perform backpropagation using a loss metric that includes an aspect associated with a parameter that controls the entropy. For example, the WTRU may be configured minimize loss metric that is minimized for the given channel $[H^R; H^I]$ using backpropagation algorithm is given as follows:

$$\left\|\left[H^R; H^I\right] - D(\hat{Z}_H; W_d)\right\|_2^2 + \lambda\Phi(\hat{Z}_H; W_\Phi),$$

where $\lambda>0$, is the parameter that control the entropy. The value of $\lambda$ may be configured to tradeoff between compression and reconstruction loss. Possibly, the WTRU may receive the value $\lambda$ by network configuration.

In example modes of operation using principles of the disclosure herein, the following examples are provided. FIG. 4 may be referenced as a general architecture for the following examples.

In a first example embodiment, a first transmitting node (e.g. a WTRU or base station) may be configured to send data over a wireless channel, wherein the data includes at least an output from a first AI component. In the embodiment, the first transmitting node is configured to initiate a training procedure based on a trigger condition. An example training procedure may involve at least one of the following:

- a. transmitting over the wireless channel a plurality of ordered training pairs,
  - i. wherein each pair consists of input to the first AI component and corresponding output of the first AI component, and/or
  - ii. wherein training pairs may be addressed to a second AI component in a receiving node.
- b. receiving over the wireless channel a partially processed training information corresponding to the transmitted training pairs,
  - i. wherein the training information may originate from the second AI component,
  - ii. wherein partially processed training information may carry the gradients at the output layer of the first AI component, possibly as a result of partial backpropagation over the second AI component, possibly in the form of tensor state(s), and/or
  - iii. wherein partially processed training information may be addressed to the first AI component.
- c. Updating the learnable parameters of the first AI component based on partially processed training information,
  - i. Wherein the updating may involve performing partial backpropagation over the first AI component using the received tensor state(s).

In a second example embodiment, a second receiving node (e.g. a base station or WTRU) is configured to receive data over a wireless channel, wherein the data is addressed to the second AI component in the second receiving node. In the embodiment, the second receiving node is configured, to perform a training procedure involving at least one of the following:

- a. receiving over the wireless channel a plurality of ordered training pairs,
  - i. wherein each pair consists of input to the first AI component and corresponding output of the first AI component,
  - ii. Perform partial backpropagation over the second AI component using the output of the first AI component as input and the input of the first AI component as output
- b. Updating the learnable parameters of the second AI component
- c. Determine partially processed training information
  - i. wherein partially processed training information may carry the result of partial backpropagation over the second AI component, possibly in the form of tensor state(s),
- d. transmitting over the wireless channel, the partially processed training information corresponding to the received training pairs,
  - i. wherein the partially processed information may be addressed to a first AI component
  - ii. wherein partially processed training information may be applied at the output layer of the first AI component.

In a third example embodiment, a first transmitting node is configured with a first AI component for at least one control and/or data processing function, the first AI processing function:

- a. Monitors a trigger condition based on configured reconstruction loss function.

i. Wherein the reconstruction loss function may indicate the difference between input of the first AI component and the output of the second AI component.

ii. For example, the trigger condition may be that the average reconstruction loss function over a time window is above a configured threshold, b. Transmits an indication (e.g. scheduling request (SR)) on a UL resource (e.g. PUCCH), wherein the indication carries the status of the first AI component.

i. Wherein the status could indicate that the trigger condition is satisfied or explicitly indicate information about reconstruction loss, number of samples whose reconstruction loss is above a threshold etc.

In a fourth example embodiment, a first transmitting node with a first AI component may be configured with a third AI component. In the example, a. The third AI component takes as input, the output and/or input of the first AI component, b. Monitoring the output of the third AI component may include, i. Wherein the monitoring involves comparing the output of the third AI component to a threshold.

ii. Wherein the output of the third component is a performance metric of the first AI component and/or combined performance of first and third AI component.

c. Based on a condition on the outcome of the third AI component, initiate a training procedure.

i. For example, the condition may be that the performance metric is below a threshold.

It is noted that the hereinabove techniques, when used, may avoid a significantly higher storage requirement, processing and training complexity associated with completely offline AI application, by enabling a small efficient AI that is contextual and adapts to actual channel conditions, deployments, smaller models/simpler processing, and is adaptable to WTRU and/or NW capability, etc.

It is also noted that the herein above techniques describe means to train autoencoder with quantized latent vector, by means of simulating quantization using a noise layer with preconfigured statistics. Also discussed are means to control the autoencoder training to tradeoff between compression and reconstruction loss.

Figure 5:
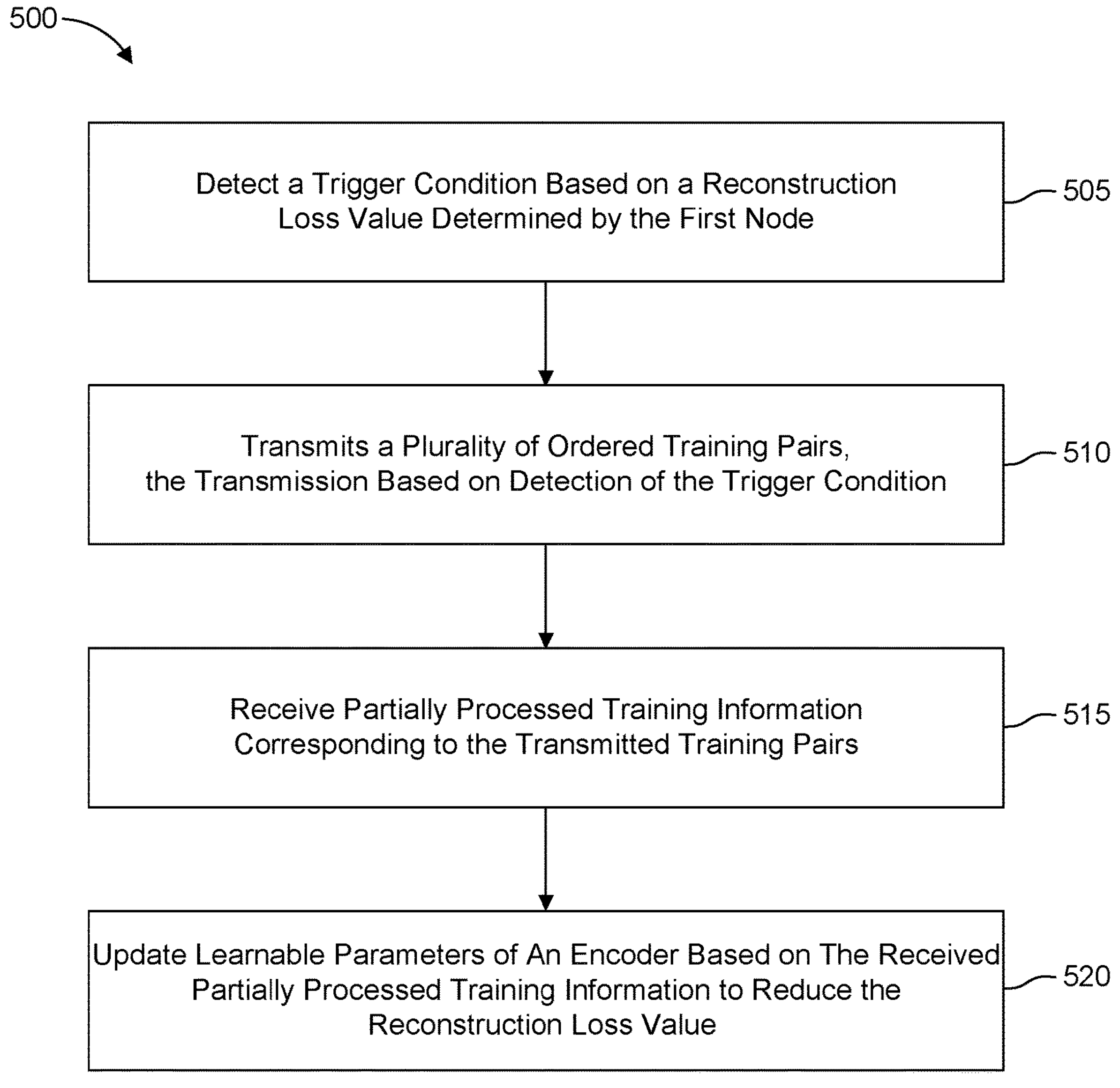
FIG. 5 is an example flow diagram of a method according to an embodiment.

FIG. 5 is an overall example method 500 performed by a first node in a wireless network. The first node may contain an encoder function in an autoencoder architecture. An example first node may be node 410 of FIG. 4, which may be either a WTRU or a base station. In the instance where the first node 410 is a local WTRU, the second node 450, which can contain a decoder function, may be either a remote WTRU or another network entity, such as a base station. In the instance where the first node 410 is a network entity, such as a base station, the second node 450 may be a WTRU. In either instance, at 505, the first node monitors/tests for a trigger condition to detect an occurrence of the trigger condition based on a reconstruction loss value. The reconstruction loss value is determined by the first node. At 510, the first node transmits, to the decoder in the second node, a plurality of ordered training pairs, the transmission based on the detection of the trigger condition by the first node. At 515, the first node receives, from the second node, partially processed training information corresponding to the transmitted training pairs. At 520, the first node updates learnable parameters of the encoder in the first node based on the received partially processed training information in order to reduce the reconstruction loss value determined in the first node. The method 500 can improve the accuracy of the encoder in an autoencoder architecture such as in the example architecture of FIG. 4.

In FIG. 5, at 505, the detection of a trigger condition may include monitoring/testing for and detection of a trigger condition based on a reconstruction loss value in a first artificial intelligence component of the first node. In FIG. 5, at 505, the monitoring/testing for and detection of a trigger condition based on a reconstruction loss value in a first component of the first node may include detection of an average reconstruction loss function that is above a threshold. In addition, the threshold may be evaluated over a time window.

In FIG. 5, at 510, the transmitting of a plurality of ordered training pairs may include transmitting training pairs addressed to an artificial intelligence component of the second node. Also, the transmitting of a plurality of ordered training pairs may include transmitting ordered pairs that include an input to the encoder and a corresponding output of the encoder of the first node.

In FIG. 5, at 515, the receiving of partially processed training information corresponding to the transmitted training pairs may include any of (i) receiving gradients in the form of a tensor state based on partial backpropagation in the second node, (ii) receiving the partially processed training information including addressing information for an AI component in the first node and to apply the received gradients and perform partial backpropagation in the first node, and/or (iii) receiving the partially processed training information to determine updates to one or more learnable parameters of the encoder in the first node.

In FIG. 5, at 520, the updating of learnable parameters of the encoder based on partially processed training information may include updating learnable parameters involving partial backpropagation over an artificial intelligence component in the first node using a received tensor state.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the methods, apparatuses and systems provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM")) or non-volatile (e.g., Read-Only Memory (ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

What is claimed:

1. A method performed by a first node in a wireless network, the method comprising:

monitoring a trigger condition based on a reconstruction loss value of a first artificial intelligence (AI) component of the first node;

transmitting, over the wireless network to a second node having a second AI component, information indicating a plurality of training pairs, each training pair comprising encoded channel state information (CSI) and reference CSI, wherein the transmitting is based on detection of the trigger condition;

receiving, from the second node, an indication of tensor state information generated by the second AI component corresponding to the training pairs; and updating parameters of the first AI component of the first node based on the indication of tensor state information, whereby the reconstruction loss value of the first AI component is reduced.

2. The method of claim 1, wherein monitoring the trigger condition comprises monitoring the reconstruction loss value exceeding a threshold value, the reconstruction loss value being calculated by the first AI component.

3. The method of claim 2, wherein the first AI component comprises an encoder function of the first node.

4. The method of claim 1, wherein transmitting information indicating the plurality of training pairs further comprises transmitting a plurality of ordered training pairs and an address of the second AI component of the second node.

5. The method of claim 1, wherein the second AI component comprises a decoder function of the second node.

6. The method of claim 1, wherein receiving, from the second node, the indication of tensor state information generated by the second AI component comprises receiving an indication of gradients of the second AI component.

7. The method of claim 6, wherein the indication of gradients of the second AI component is determined as a difference between an output of the second AI component and a reference CSI, wherein a corresponding encoded CSI is an input to the second AI component.

8. The method of claim 1, wherein receiving, from the second node, the indication of tensor state information further comprises receiving an address of the first AI component.

9. The method of claim 1, wherein updating the parameters further comprises updating one or more of weights and biases of the first AI component.

10. A wireless transmit/receive unit (WTRU) operating as a first node in a wireless network, the WTRU comprising circuitry, including a receiver, a transmitter, a processor, and memory, wherein:

the processor is configured to:

monitor a trigger condition based on a reconstruction loss value of a first artificial intelligence (AI) component of the first node;

the transmitter is configured to:

transmit, over the wireless network to a second node having a second AI component, information indicating a plurality of training pairs, each training pair comprising encoded channel state information (CSI) and reference CSI, wherein transmission is based on detection of the trigger condition;

the receiver is configured to:

receive, from the second node, an indication of tensor state information generated by the second AI component corresponding to the training pairs; and wherein the processor is further configured to:

update parameters of the first AI component of the first node based on the indication of tensor state information whereby the reconstruction loss value of the first AI component is reduced.

11. The WTRU of claim 10, wherein the processor is configured to monitor the reconstruction loss value exceeding a threshold value, the reconstruction loss value being calculated by the first artificial intelligence (AI) component.

12. The WTRU of claim 10, wherein the first AI component comprises an encoder function of the first node and the second AI component comprises a decoder function of the second node.

13. The WTRU of claim 10, wherein the transmitter is configured to transmit a plurality of ordered training pairs and an address of the second AI component of the second node.

14. The WTRU of claim 10, wherein the receiver is configured to receive an indication of gradients of the second AI component.

15. The WTRU of claim 10, wherein the receiver is further configured to receive an address of the first AI component.

16. The WTRU of claim 10, wherein the processor is configured to update one or more of weights and biases of the first AI component.

17. The WTRU of claim 10, wherein the processor is configured to update the parameters of the first AI component after a back propagation over the first AI component is performed.

18. A non-transient computer-readable storage medium having instructions therein which, when executed by a processor, perform the method of:

monitoring a trigger condition based on a reconstruction loss value of a first artificial intelligence (AI) component of the first node;

transmitting, over the wireless network to a second node having a second AI component, information indicating a plurality of training pairs, each training pair comprising encoded channel state information (CSI) and reference CSI, wherein the transmitting is based on detection of the trigger condition;

receiving, from the second node, an indication of tensor state information generated by the second AI component corresponding to the training pairs; and updating parameters of the first AI component of the first node based on the indication of tensor state information, whereby the reconstruction loss value of the first AI component is reduced.

19. The non-transient computer-readable storage medium of claim 18, wherein monitoring the trigger condition comprises monitoring the reconstruction loss value exceeding a threshold value, the reconstruction loss value being calculated by the first AI component.

20. The non-transient computer-readable storage medium of claim 18, wherein updating the parameters further comprises updating one or more of weights and biases of the first AI component.

* * * * *